(12) United States Patent
Yasuda

(10) Patent No.: US 10,366,465 B2
(45) Date of Patent: Jul. 30, 2019

(54) IMAGE CAPTURING APPARATUS, METHOD OF CONTROLLING SAME, AND STORAGE MEDIUM

(71) Applicant: CANON KABUSHIKI KAISHA, Tokyo (JP)

(72) Inventor: Takayuki Yasuda, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/924,851

(22) Filed: Mar. 19, 2018

(65) Prior Publication Data
US 2018/0276783 A1 Sep. 27, 2018

(30) Foreign Application Priority Data
Mar. 22, 2017 (JP) .................. 2017-056458

(51) Int. Cl.
H04N 5/235 (2006.01)
G06T 1/00 (2006.01)
H04N 5/232 (2006.01)
G06T 5/50 (2006.01)
G06T 5/40 (2006.01)

(52) U.S. Cl.
CPC .............. *G06T 1/0007* (2013.01); *G06T 5/40* (2013.01); *G06T 5/50* (2013.01); *H04N 5/2353* (2013.01); *H04N 5/23229* (2013.01); *G06T 2207/10144* (2013.01); *G06T 2207/20208* (2013.01); *G06T 2207/20221* (2013.01)

(58) Field of Classification Search
CPC ...... H03M 7/30–707; H04N 19/00–99; H04N 1/41–419; H04N 5/917; H04N 5/919; H04N 5/9261; H04N 5/9264; H04N 9/8042; H04N 9/8045; H04N 9/8047; H04N 9/8081; H04N 11/02; H04N 2009/8084; H04N 5/2356; H04N 5/353; H04N 5/3535; H04N 5/35536; H04N 5/35581; H04N 5/35545; H04N 5/235–243; G06T 9/00–40
See application file for complete search history.

(56) References Cited

FOREIGN PATENT DOCUMENTS

JP 2013-126181 A 6/2013
JP 2013-179584 A 9/2013

*Primary Examiner* — Sinh Tran
*Assistant Examiner* — Selam T Gebriel
(74) *Attorney, Agent, or Firm* — Cowan, Liebowitz & Latman, P.C.

(57) ABSTRACT

An image capturing apparatus comprises: an image capturing unit; an acquisition unit that acquires at least two images having different exposures; a compression unit that acquires at least two compressed images; a transmission unit that transmits the at least two compressed images; a composition unit that generates a composite image by compositing the transmitted at least two compressed images; and a luminance distribution acquisition unit that acquires luminance distribution information of the composite image, the acquisition unit controlling exposure of the at least two images based on the luminance distribution information acquired by the luminance distribution acquisition unit, and the compression unit performing the compression processing of the at least two images based on the luminance distribution information and the exposure of the at least two images.

12 Claims, 9 Drawing Sheets

| RATIO OF NUMBERS OF PIXELS | EXPOSURE TIME RATIO |
|---|---|
| 4 : 1 | 1 : 1 |
| 2 : 1 | 9 : 7 |
| 1.5 : 1 | 10 : 6 |
| 1 : 1 | 11 : 5 |
| 1 : 1.5 | 12 : 4 |
| 1 : 2 | 13 : 3 |
| 1 : 4 | 14 : 2 |
| 1 : 8 | 15 : 1 |

NARROW DYNAMIC RANGE ↑

↓ WIDE DYNAMIC RANGE

WHEN D RANGE IS NARROW

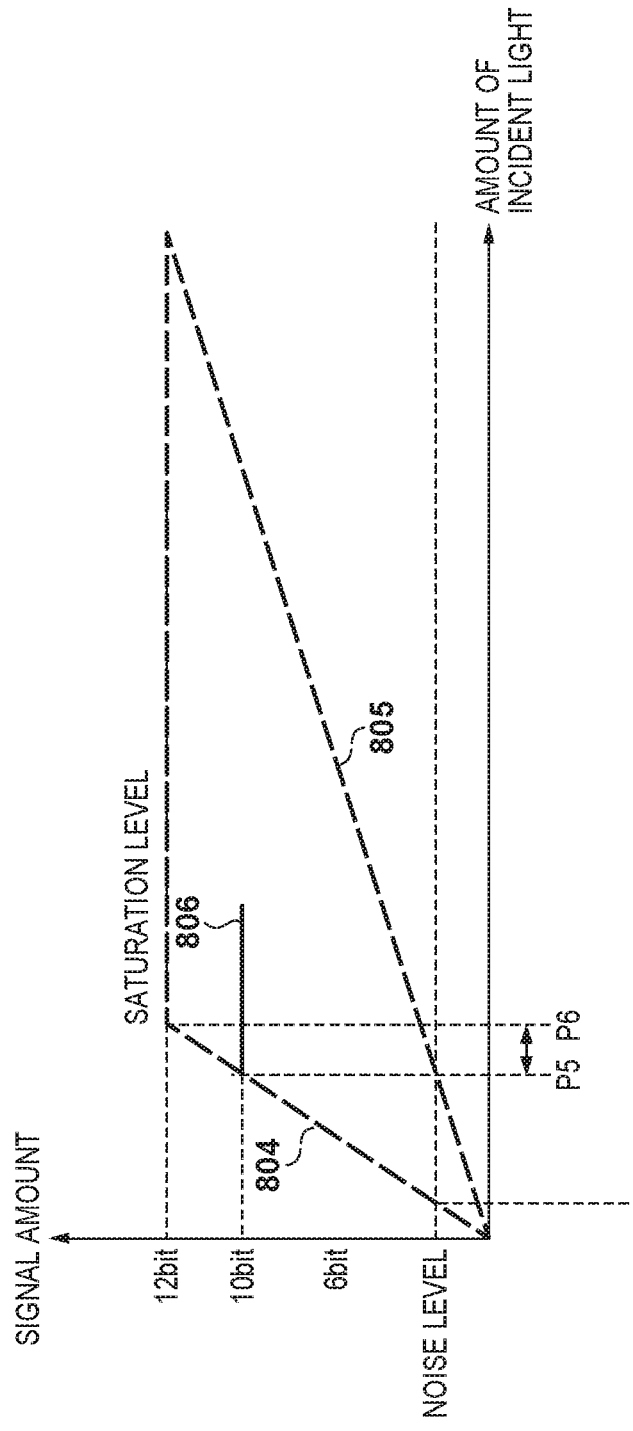

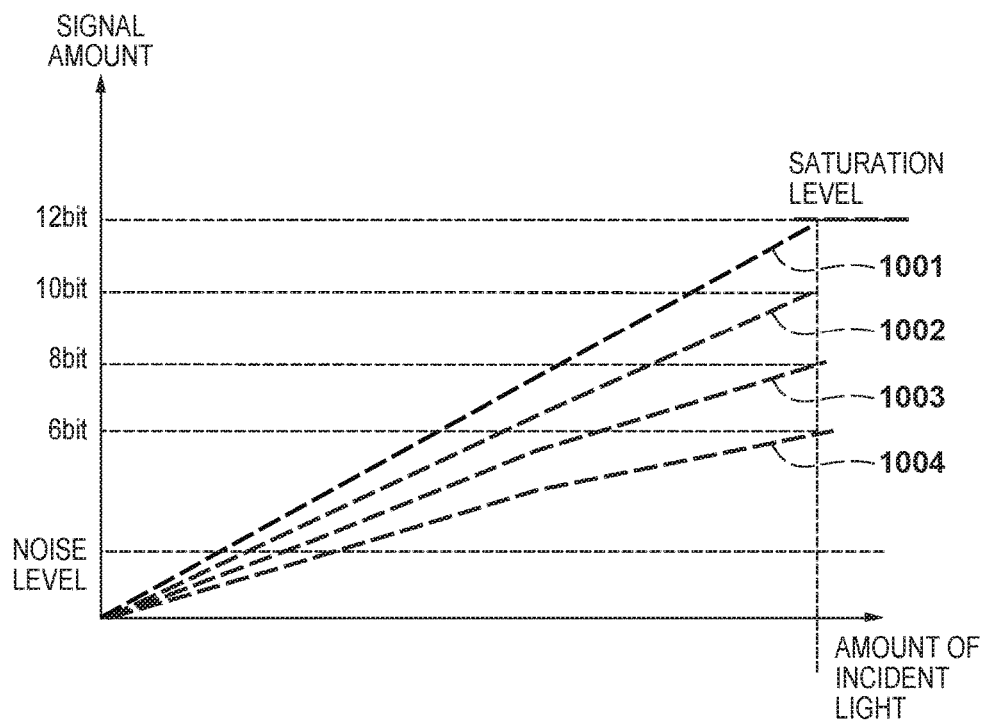

IMAGE CAPTURING APPARATUS, METHOD OF CONTROLLING SAME, AND STORAGE MEDIUM

BACKGROUND OF THE INVENTION

Field of the Invention

The present invention relates to an image capturing apparatus for generating a moving image having a wide dynamic range by compositing images having different exposures.

Description of the Related Art

Conventionally, a technique for generating an image having a wide dynamic range by compositing images having different exposures has been proposed.

For example, Japanese Patent Laid-Open No. 2013-179584 discloses a technique for compressing images captured by different exposure times to thereby reduce a memory capacity or a DRAM bandwidth relating to composition of these images. In addition, Japanese Patent Laid-Open No. 2013-126181 discloses a technique for generating a high-quality composite image by using a histogram to quickly execute a change of an exposure condition when capturing an image.

However, there are the following problems in the configurations of the foregoing conventional techniques. In the technique disclosed in Japanese Patent Laid-Open No. 2013-179584, because image compression is after a plurality of images having different exposures are acquired from an image capturing element, in image composition for a moving image for which many pixels and a high frame rate is requested, there are cases where transmission of a signal is not timely due to the bandwidth of a transmission channel.

In addition, in the technique disclosed in Japanese Patent Laid-Open No. 2013-126181, although exposure control is performed at the time of capturing, in image composition for a moving image in which many pixels and a high frame rate is requested, there are cases where signal transmission is not timely due to the bandwidth of a transmission channel. In addition, when a transmission channel is used at all times, power consumption increases at a time of moving image capturing, in particular.

SUMMARY OF THE INVENTION

The present invention is made in light of the foregoing problems, and enables the generation of a moving image having many pixels and a high frame rate in a case of compositing images having different exposures to generate a moving image having a wide dynamic range.

According to a first aspect of the present invention, there is provided an image capturing apparatus, comprising: an image capturing unit configured to capture an object and output a moving image; an acquisition unit configured to acquire from the image capturing unit at least two images having different exposures for one frame of the moving image; a compression unit configured to acquire at least two compressed images by performing respectively different compression processing on the at least two images having different exposures; a transmission unit configured to transmit the at least two compressed images; a composition unit configured to generate a composite image by compositing the transmitted at least two compressed images; and a luminance distribution acquisition unit configured to acquire luminance distribution information of the composite image, wherein the acquisition unit controls exposures of the at least two images having different exposures in a next frame of the moving image based on the luminance distribution information acquired by the luminance distribution acquisition unit, and the compression unit performs compression processing of the at least two images having different exposures based on the luminance distribution information and the exposures of the at least two images having different exposures.

According to a second aspect of the present invention, there is provided a method of controlling an image capturing apparatus provided with an image capturing unit operable to capture an object and output a moving image, the method comprising: acquiring from the image capturing unit at least two images having different exposures for one frame of the moving image; acquiring at least two compressed images by performing respectively different compression processing on the at least two images having different exposures; transmitting the at least two compressed images; generating a composite image by compositing the transmitted at least two compressed images; and acquiring luminance distribution information of the composite image, wherein, in the acquisition from the image capturing unit, exposures of the at least two images having different exposures in a next frame of the moving image are controlled based on the luminance distribution information acquired in the luminance distribution acquisition, and the compression processing of the at least two images having different exposures is performed based on the luminance distribution information and the exposures of the at least two images having different exposures.

Further features of the present invention will become apparent from the following description of exemplary embodiments with reference to the attached drawings.

BRIEF DESCRIPTION OF THE DRAWINGS

FIG. 6 is a view illustrating an example of an exposure time ratio setting table.

FIG. 9 is a view illustrating compression of an image having a wide dynamic range in the first embodiment.

FIG. 10 is a view illustrating an example of a low-exposure image compression rate setting table.

FIG. 11 is a view illustrating compression in accordance with a gamma correction of a low-exposure image in the first embodiment.

DESCRIPTION OF THE EMBODIMENTS

Hereinafter, referring to the attached drawings, embodiments of the present invention will be described in detail.

(First Embodiment)

Figure 1:
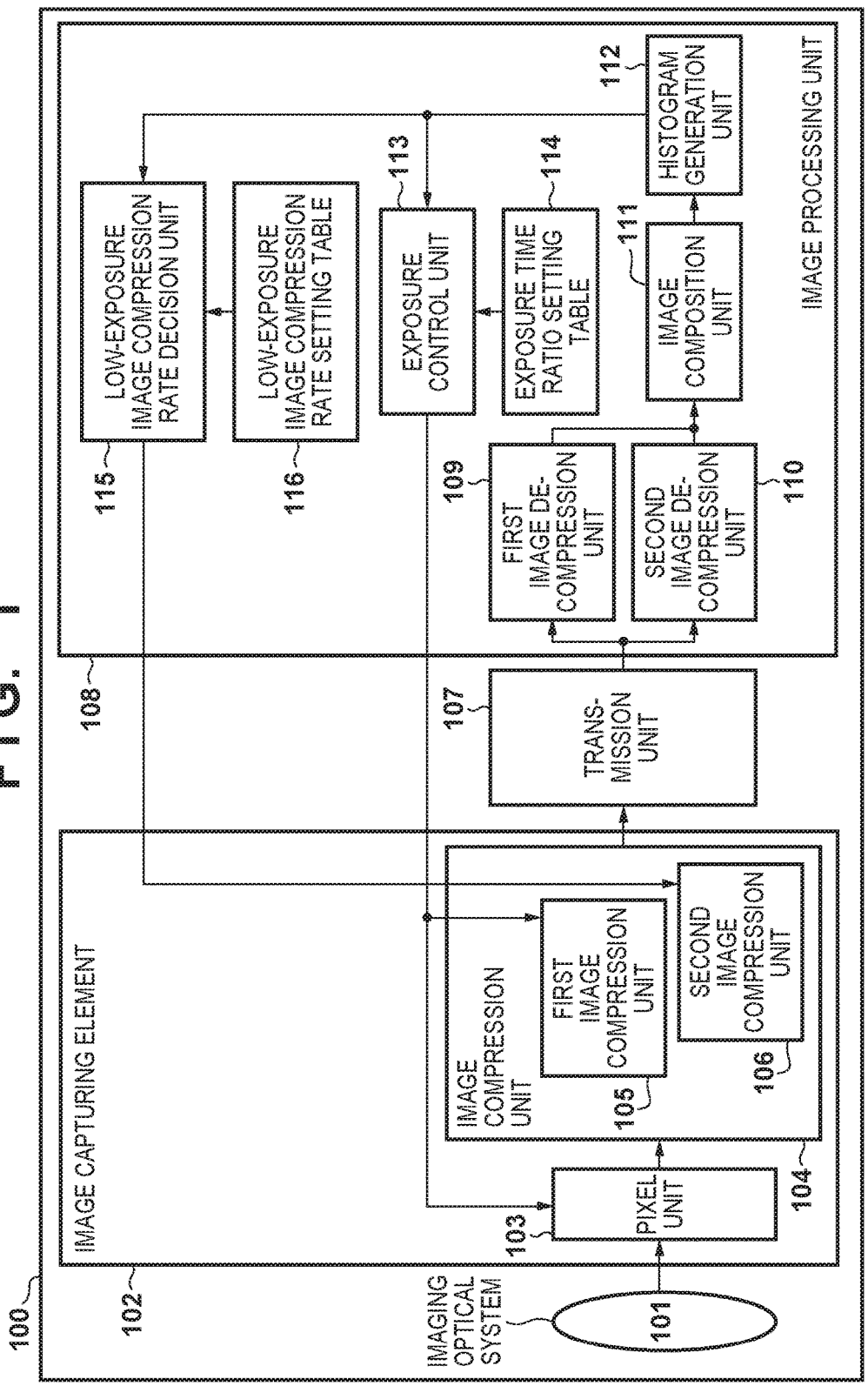
FIG. 1 is a block diagram illustrating a configuration of a first embodiment of an image capturing apparatus of the present invention.

FIG. 1 is a block diagram illustrating a configuration of a first embodiment of an image capturing apparatus of the present invention. In FIG. 1, an image capturing apparatus 100 is provided with an imaging optical system 101, an image capturing element 102, and an image processing unit 108.

In the image capturing element 102, a pixel unit 103 converts an optical image of an object formed on the imaging optical system 101 into an electrical signal. In addition, by control of an exposure time from an exposure control unit 113 which is described later, two image signals having different exposures are generated. The pixel unit 103 is configured by a plurality of pixels each of which is capable of a global shutter operation and have two memory units with respect to one photodiode (hereinafter, PD) being arrayed. An image compression unit 104 has a first image compression unit 105 and a second image compression unit 106, and compresses a high-exposure image and a low-exposure image as the two image signals having different exposures transferred from the pixel unit 103. Note that, the image capturing element 102 is a stacked-type image capturing element, and is configured by the pixel unit 103 and the image compression unit 104 being arranged on respectively different semiconductor substrates that are stacked therein.

The first image compression unit 105 of the image compression unit 104 compresses by clipping (deleting) upper bits of a high-exposure image, based on exposure information from the exposure control unit 113 that is described later. In addition, the second image compression unit 106 performs tone compression after performing a gamma correction (adjusting a gamma curve) on a low-exposure image by a method that is described below.

A transmission unit 107 transmits the high-exposure image and the low-exposure image compressed by the image compression unit 104 to the image processing unit 108. The transmission unit 107 can idle in transmission of a signal in accordance with a result of compression in the image compression unit 104 of the high-exposure image and the low-exposure image.

The image processing unit 108 decompresses the compressed high-exposure image and a low-exposure image to perform image composition or the like. A first image decompression unit 109 decompresses the compressed image of the high-exposure image that is transmitted via the transmission unit 107 and compressed by the first image compression unit 105. A second image decompression unit 110 decompresses the compressed image of the low-exposure image that is transmitted via the transmission unit 107 and compressed by the second image compression unit 106. An image composition unit 111 composites the high-exposure image decompressed by the first image decompression unit 109 and the low-exposure image decompressed by the second image decompression unit 110 to generate an image having a wider dynamic range.

A histogram generation unit (luminance distribution acquisition unit) 112 generates a histogram (luminance distribution information) from the composite image generated by the image composition unit 111. The exposure control unit 113 uses the histogram generated by the histogram generation unit 112 and an exposure time ratio setting table that is described later to control an exposure time for the pixel unit 103 during moving image capturing. In addition, it controls a compression rate in the first image compression unit 105. Details of the exposure control unit 113 are described later.

An exposure time ratio setting table 114 is stored in a ROM or a RAM in advance, and is used to decide a ratio for the exposure time in the exposure control unit 113. A low-exposure image compression rate decision unit 115 uses the histogram generated by the histogram generation unit 112 and a low-exposure image compression rate setting table which is described later to decide a compression rate for a low-exposure image in the second image compression unit 106. Details of the low-exposure image compression rate decision unit 115 are described later. A low-exposure image compression rate setting table 116 is stored in the ROM or the RAM in advance, and the compression rate for a low-exposure image is decided after the brightness of an object is determined in the low-exposure image compression rate decision unit 115.

Figure 2:
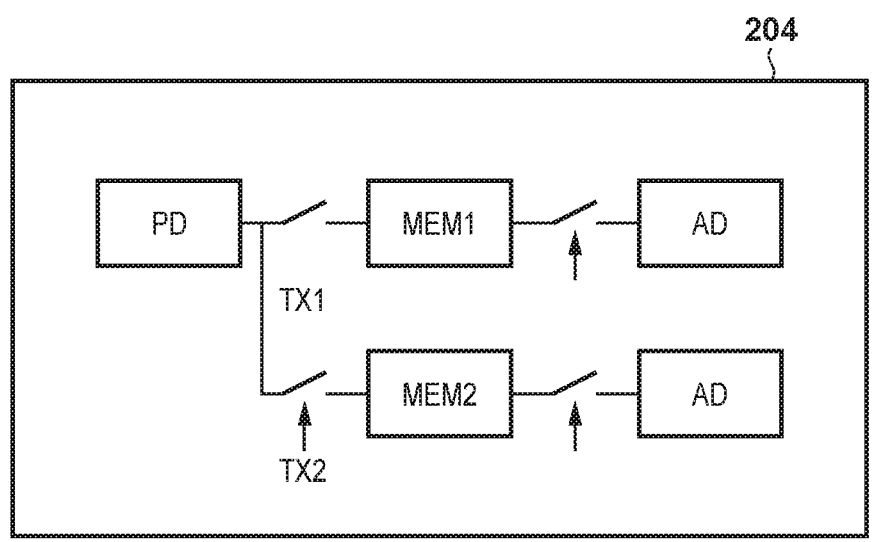
FIG. 2 is a view illustrating a configuration of a pixel in the first embodiment.

Next, FIG. 2 is a view for illustrating a configuration of a pixel in the present embodiment. Using FIG. 2, description is given regarding configuration and operation of a pixel in the present embodiment.

As illustrated in FIG. 2, a pixel 204 is configured by two memory units MEM1 and MEM2 being arranged with respect to one PD. In the present embodiment, by turning a switch TX1 on, a high-exposure image is stored in the memory unit MEM1, and by turning the switch TX2 on a low-exposure image is stored in the memory unit MEM2. The images stored in the memory units MEM1 and MEM2 are outputted to the image compression unit 104 after being respectively subject to an AD conversion.

Figure 3:
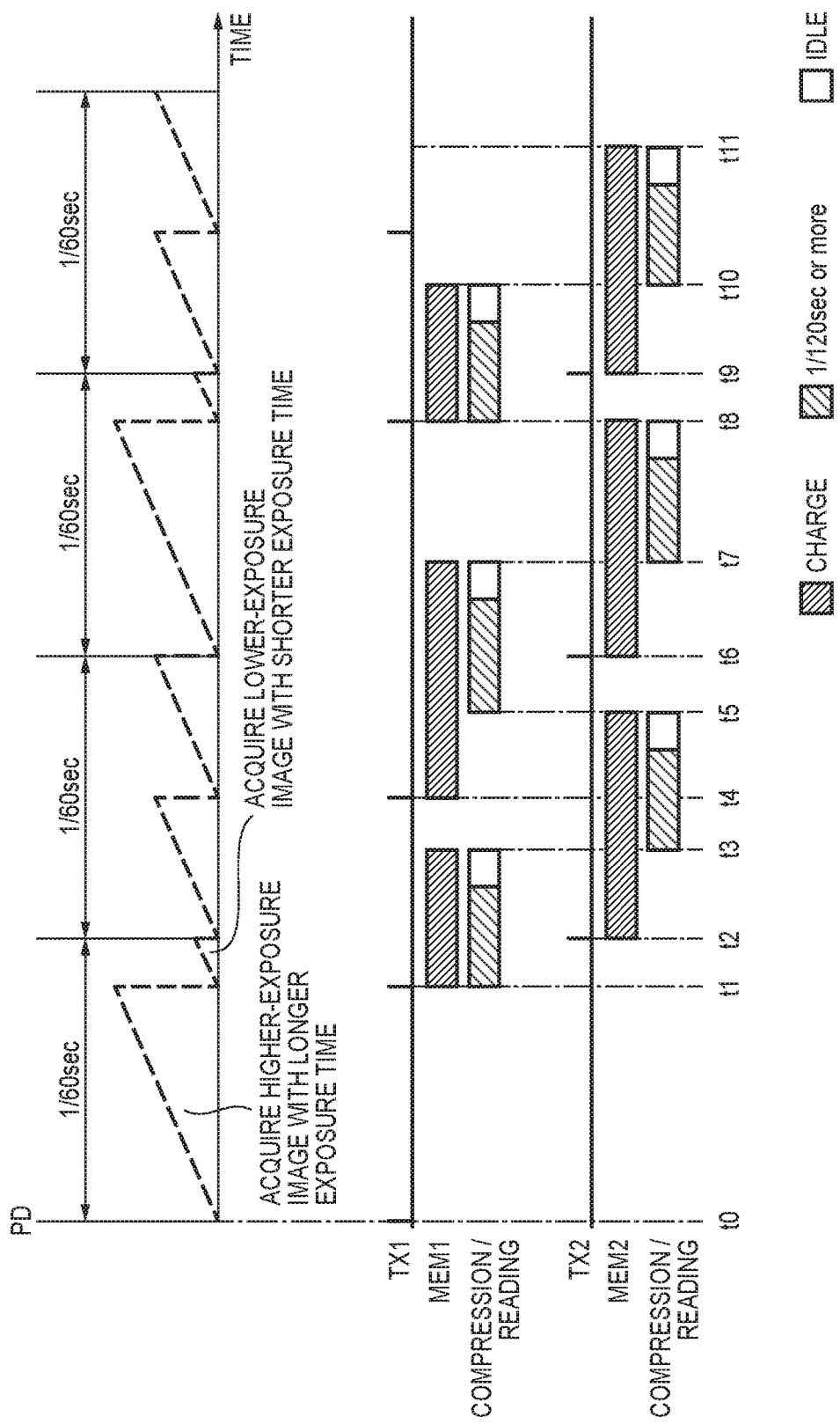
FIG. 3 is a timing chart for a time of moving image capturing in the first embodiment.

Next, FIG. 3 is a timing chart for illustrating an operation for acquiring a high-exposure image (an image having a large exposure amount), and a low-exposure image (an image having a low exposure amount), in the present embodiment. Using the timing chart of FIG. 3, description is given regarding exposure control with respect to the pixel unit 103 in the present embodiment. In the present embodiment, it is assumed that two images, a high-exposure image and a low-exposure image, are acquired within the time of 1/60 of a second.

Firstly, at a time t0, capturing of an image of a first frame of a moving image starts. In the period between the time t0 to a time t1, exposure of a high-exposure image is performed. At the time t1, the switch TX1 is turned on, and the charge accumulated in the PD is transferred to the memory unit MEM1 in one batch. In the period between the time t1 to a time t3, reading of data from the memory unit MEM1 and compression by the first image compression unit 105 of the high-exposure image is performed. In such a case, the high-exposure image is compressed in the first image compression unit 105 so as to satisfy the bandwidth of the transmission unit 107. In addition, when the image is sufficiently compressed, an operation for allowing a power consumption reduction is performed by the transmission unit 107 idling (idle period in the drawing). Description is given later regarding details of the compression processing in the first image compression unit 105.

In the period between the time t1 to a time t2, exposure of a low-exposure image is performed. At the time t2, the switch TX2 is turned on, and the charge accumulated in the PD is transferred to the memory unit MEM2 in one batch. In the period between the time t3 to a time t5, reading of data from the memory unit MEM2 and compression by the second image compression unit 106 of the low-exposure image is performed. In such a case, the low-exposure image is compressed in the second image compression unit 106 so as to satisfy the bandwidth of the transmission unit 107. In addition, when the image is sufficiently compressed, an operation for allowing a power consumption reduction is performed by the transmission unit 107 idling (idle period in the drawing). Description is given later regarding details of the compression processing in the second image compression unit 106.

At the time t2, exposure for the second frame of the moving image starts. A ratio of exposure times for acquiring the high-exposure image and the low-exposure image of the second frame is decided by the exposure control unit 113 from the exposure time ratio setting table 114 and the histogram of the first frame generated by the histogram generation unit 112.

In the present embodiment, it is set so that the dynamic range in the first frame is determined to be narrower than a predetermined range, and set so that the exposure time ratio for the high-exposure image and the low-exposure image in the second frame becomes smaller. Here, a reason for setting the exposure time ratio between the high-exposure image and the low-exposure image to get smaller for an object for which the dynamic range is determined to be narrow is as follows. Specifically, in image compression in accordance with reducing the upper bits of the high-exposure image by the first image compression unit 105, this is to increase the compression rate without impairing the image quality even if many bits are reduced. Because of this, it is possible to cause the transmission unit 107 to idle, and it is possible to make a contribution to a power consumption reduction or the like.

In a period between the time t2 to the time t4, exposure of a high-exposure image for generating an image of the second frame is performed. At the time t4, the switch TX1 is turned on, and the charge accumulated in the PD is transferred to the memory unit MEM1 in one batch. In the period between the time t5 to a time t7, reading of data from the memory unit MEM1 and compression by the first image compression unit 105 of the high-exposure image is performed. In the period between the time t4 to a time t6, exposure of a low-exposure image is performed. At the time t6, the switch TX2 is turned on, and the charge accumulated in the PD is transferred to the memory unit MEM2 in one batch. In the period between the time t7 to a time t8, reading of data from the memory unit MEM2 and compression by the second image compression unit 106 of the low-exposure image is performed.

At the time t6, exposure for the third frame of the moving image starts. In the present embodiment, it is assumed that the dynamic range is determined to be wider in the second frame. When generating an image of a third frame, the exposure time ratio for a high-exposure image and a low-exposure image is set to be even larger, so as to enable image composition with an even wider dynamic range.

In the period between the time t6 to the time t8, exposure of the high-exposure image for the third frame is performed. At the time t8, the switch TX1 is turned on, and the charge accumulated in the PD is transferred to the memory unit MEM1 in one batch. In the period between the time t8 to a time t10, reading of data from the memory unit MEM1 and compression of the high-exposure image is performed. In the period between the time t8 to the time t9, exposure of a low-exposure image is performed. At the time t9, the switch TX2 is turned on, and the charge accumulated in the PD is transferred to the memory unit MEM2 in one batch. In the period between the time t10 to a time t11, reading of data from the memory unit MEM2 and compression by the second image compression unit 106 of the low-exposure image is performed.

In this way, from the histogram for the previous frame of a moving image, it is determined whether the dynamic range of an object is wide or narrow, and exposure times of a high-exposure image and a low-exposure image for the next frame of the moving image are controlled. Consequently, at an object having a narrow dynamic range, high luminance image bits are reduced, and it is possible to allow for a power consumption reduction by causing the transmission unit 107 to idle. Meanwhile, for an object having a wide dynamic range, it is possible to acquire a high-exposure image and a low-exposure image necessary for image composition.

Next, using FIG. 4 through FIG. 9, description is given regarding a method of controlling exposure by the exposure control unit 113, and a method of controlling a compression rate in the first image compression unit 105.

Figure 4:
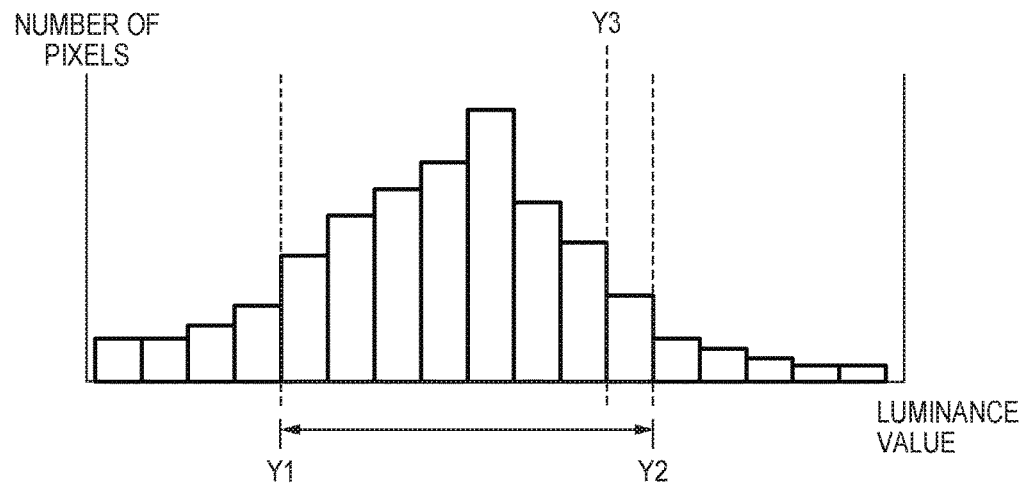
FIG. 4 is a view illustrating a histogram of an image after compositing in the first embodiment.
Figure 5:
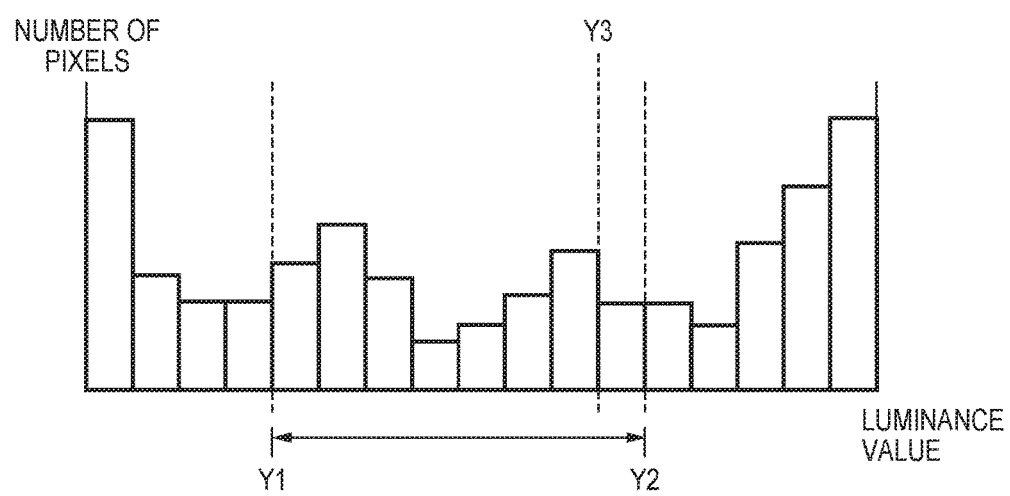
FIG. 5 is a view illustrating a histogram of an image after compositing in the first embodiment.

The exposure control unit 113 calculates exposure times from the histograms illustrated in FIG. 4 and FIG. 5 that are calculated by the histogram generation unit 112 from the composite image obtained by the image composition unit 111, and the exposure time ratio setting table 114 illustrated in FIG. 6 that is stored in a ROM or RAM in advance.

Firstly, in the histograms illustrated in FIG. 4 and FIG. 5, a ratio between a number of pixels whose luminance value is between a luminance value Y1 to Y2, and the sum of a number of pixels whose luminance value is less than the luminance value Y1 and a number of pixels whose luminance value is greater than the luminance value Y2 is calculated. Next, a comparison is made between the calculated ratio and the exposure time ratio setting table 114 illustrated in FIG. 6, and the exposure control unit 113 decides the exposure time ratio.

Giving an explanation regarding FIG. 6 here, the column for the ratio of the number of pixels represents a ratio (there are for example eight types of ratios in FIG. 6) between the number of pixels whose luminance value is between the luminance value Y1 to Y2, and the sum of the number of pixels whose luminance value is less than the luminance value Y1 and the number of pixels whose luminance value is greater than the luminance value Y2. The exposure time ratio column represents exposure time ratios for a high-exposure image and a low-exposure image corresponding to eight types of ratios for the number of pixels.

The meaning is that the higher in the column of the exposure time ratio setting table 114 of FIG. 6 the narrower the dynamic range of the object is, and the lower in the column the wider the dynamic range is. For example, when the ratio for the number of pixels is 2:1, it indicates that the number of pixels whose luminance value is between the luminance value Y1 to Y2 is two times the sum of a number of pixels whose luminance value is less than the luminance value Y1 and a number of pixels whose luminance value is greater than the luminance value Y2. It is illustrated that the high-exposure image and low-exposure image exposure time ratio in this case is 9:7.

In such a case, it is determined in the exposure time ratio setting table 114 that the dynamic range of the acquired image is narrower when the number of pixels whose luminance value is between the luminance value Y1 to Y2 is greater than the sum of the number of pixels whose luminance value is less than the luminance value Y1 and the number of pixels whose luminance value is greater than the luminance value Y2. The high-exposure image and low-exposure image exposure time ratio is set small so that a compression effect due to a reduction of upper bits with respect to an acquired high-exposure image is increased. Description is given later regarding details of compression processing in accordance with an effect of reducing upper bits of a high-exposure image.

In addition, it is determined in the exposure time ratio setting table 114 that the dynamic range of the acquired image is wider when the number of pixels whose luminance value is between the luminance value Y1 to Y2 is less than the sum of the number of pixels whose luminance value is less than the luminance value Y1 and the number of pixels whose luminance value is greater than the luminance value Y2. The high-exposure image and low-exposure image exposure time ratio is set to be large so that it is possible to acquire a composite image having a wider dynamic range than the acquired images. Control of exposure by the exposure control unit 113 is performed in this way.

Figure 7:
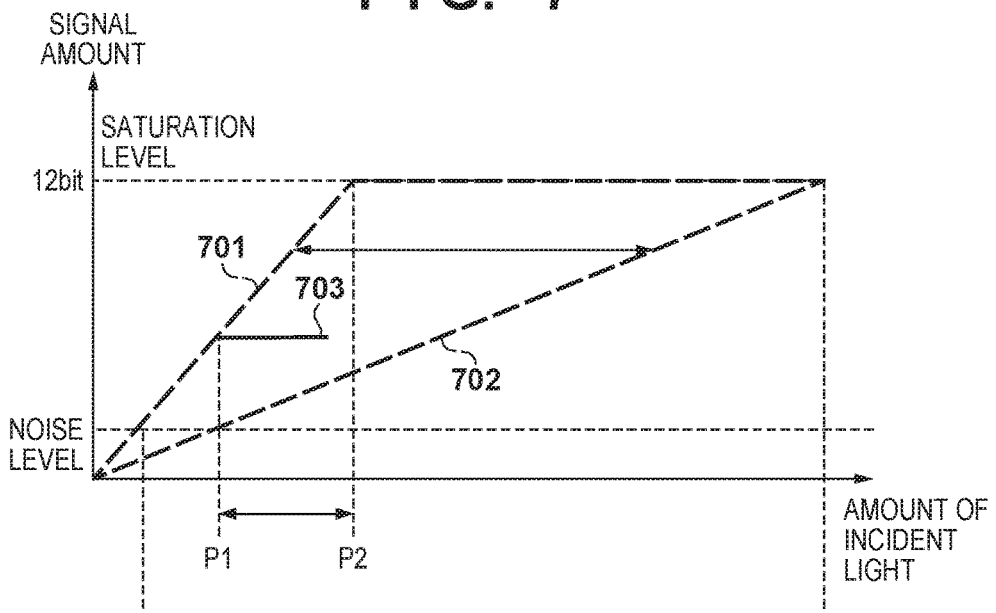
FIG. 7 is a view illustrating image compression of a high-exposure image in the first embodiment.

Next, description using FIG. 7 is given regarding compression processing in accordance with a reduction of upper bits of a high-exposure image in the first image compression unit 105. For the graph illustrated in FIG. 7, the abscissa indicates an amount of incident light and the ordinate indicates a signal amount accumulated by a PD.

The signal amount with respect to the amount of incident light increases sharper for a graph 701 of a high-exposure image having a long exposure time than for a graph 702 of a low-exposure image having a short exposure time. A region indicating amounts of incident light P1 through P2 indicates a dynamic range covered by both of the high-exposure image and the low-exposure image. Accordingly, a compressed image 703 is calculated by clipping upper bits of the high-exposure image by the first image compression unit 105.

In image composition by the image composition unit 111, because a low luminance portion of the high-exposure image and a high luminance portion of the low-exposure image are used, image compression is performed by clipping a region covered by the low-exposure image at upper bits that indicate the high luminance portion of the high-exposure image.

Figure 8:
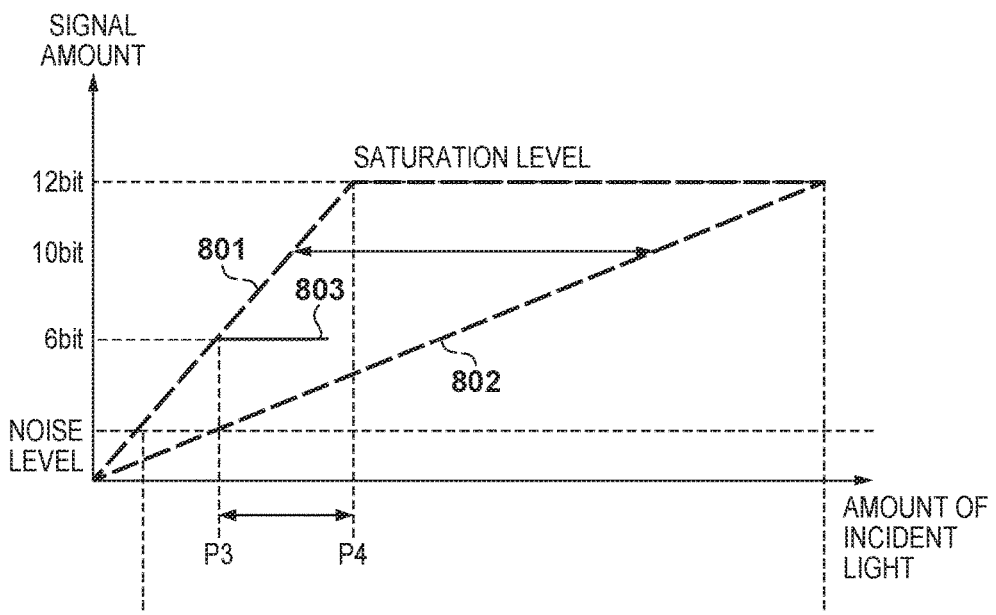
FIG. 8 is a view illustrating compression of an image having a narrow dynamic range in the first embodiment.

Next, using FIG. 8, description is given regarding the capability, in the first image compression unit 105, of making a compression rate in accordance with reduction of the upper bits of the high-exposure image larger by setting the high-exposure image and low-exposure image exposure time ratio to be smaller.

FIG. 8 illustrates a signal amount with respect to an amount of incident light at a time of acquiring an image having a narrower dynamic range. The region of the dynamic range that a graph 801 of a high-exposure image and a graph 802 of a low-exposure image both cover is indicated by a range for amounts of incident light indicated by P3 through P4. In addition, FIG. 9 illustrates a signal amount with respect to an amount of incident light at a time of acquiring an image having a wider dynamic range. The region of the dynamic range that a graph 804 of a high-exposure image and a graph 805 of a low-exposure image both cover is indicated by a range for amounts of incident light indicated by P5 through P6.

In this case, the increase of the signal amount for the amount of incident light of a high-exposure image 801 is steeper than for a high-exposure image 804, and the increase of the signal amount for the amount of incident light for a low-exposure image 805 is gentler than for a low-exposure image 802. Accordingly, while the high-exposure image 801 is compressed from 12 bits to 6 bits for example, the high-exposure image 804 is only compressed from 12 bits to 10 bits for example. In the transmission unit 107, if transmitting an image of 10 bits is a maximum transmission amount for example, the high-exposure image 804 must be transmitted without letting the transmission channel idle, whereas because the high-exposure image 801 is transmitted after being compressed to 6 bits it is possible to let the transmission channel idle for 40% of the transmission period.

In this way, by setting the high-exposure image and low-exposure image exposure time ratio small, in the first image compression unit 105, the compression rate becomes large in accordance with reduction of the upper bits of the high-exposure image, and it is possible to let the transmission unit 107 idle. As a result, it is possible to allow for a power consumption reduction. In addition, even if the high-exposure image and low-exposure image exposure time ratio is larger, in control of the compression rate in the first image compression unit 105, because the upper bits of the high-exposure image are reduced, it is possible to prevent a deficiency in transmission capability for the transmission channel.

Next, using FIG. 4, FIG. 5, FIG. 10, and FIG. 11, description is given regarding a method for deciding a compression rate for a low-exposure image in the low-exposure image compression rate decision unit 115.

In the second image compression unit 106, the low-exposure image is compressed in accordance with a gamma correction. The low-exposure image compression rate decision unit 115 decides the compression rate for a low-exposure image from histograms illustrated in FIG. 4 and FIG. 5 that are calculated by the histogram generation unit 112, and the low-exposure image compression rate setting table 116 illustrated in FIG. 10 that is stored in the ROM or the RAM in advance.

Firstly, the low-exposure image compression rate decision unit 115, in the histograms illustrated in FIG. 4 and FIG. 5, calculates a ratio between a number of pixels whose luminance value is greater than or equal to a luminance value Y3, and a number of pixels whose luminance value is less than the luminance value Y3. Next, the low-exposure image compression rate decision unit 115 compares the calculated ratio with the low-exposure image compression rate setting table 116 illustrated in FIG. 10 to decide the compression rate for the second image compression unit 106.

In such a case, it is determined, in accordance with the low-exposure image compression rate setting table 116, that the object is bright when the number of pixels whose luminance value is greater than or equal to the luminance value Y3 is larger than the number of pixels whose luminance value is less than the luminance value Y3. The compression rate is then set small so as to maintain tonality on a high luminance side with respect to the acquired images.

Meanwhile, it is determined, in accordance with the low-exposure image compression rate setting table 116, that the object is dark when the number of pixels whose luminance value is greater than or equal to the luminance value Y3 is less than the number of pixels whose luminance value is less than the luminance value Y3, and the compression rate is set to be large so as to further compress tonality of a high luminance side with respect to an acquired image.

Describing FIG. 10, the column for the ratio for the number of pixels represents ratios between the number of pixels whose luminance value is less than the luminance value Y3, and the number of pixels whose luminance value is greater than or equal to the luminance value Y3 (three types in FIG. 10). The gamma correction column represents an amount of compression by a gamma correction of a low-exposure image. Because the object is darker when the ratio between the number of pixels whose the luminance value is less than the luminance value Y3 and the number of pixels whose luminance value is greater than or equal to the luminance value Y3 is 4:1, it is indicated that compression by a gamma correction of a low-exposure image in this case is from 12 bits to 6 bits which is 6/12 compression. In addition, when the ratio for the number of pixels is 4:3, the object is brighter and thus it is indicated that compression by a gamma correction of a low-exposure image in such a case is from 12 bits to 10 bits which is 10/12 compression.

For the graph illustrated in FIG. 11, the abscissa indicates an amount of incident light and the ordinate indicates a signal amount accumulated in a PD, and a curve 1001 indicates a signal amount for the amount of incident light for a low-exposure image that has a short exposure time. A curve 1002 illustrates the curve of a gamma correction in a case where the ratio between the number of pixels whose luminance value is less than the luminance value Y3 and the number of pixels whose luminance value is greater than or equal to the luminance value Y3 is 4:3, and illustrates a low-exposure image for which a 12 bit image is compressed to 10 bits by the gamma correction. A curve 1003 illustrates the curve of a gamma correction in a case where the ratio between the number of pixels whose luminance value is less than the luminance value Y3 and the number of pixels whose luminance value is greater than or equal to the luminance value Y3 is 4:2, and illustrates a low-exposure image for which a 12 bit image is compressed to 8 bits by the gamma correction. A curve 1004 illustrates the curve of a gamma correction in a case where the ratio between the number of pixels whose luminance value is less than the luminance value Y3 and the number of pixels whose luminance value is greater than or equal to the luminance value Y3 is 4:1, and illustrates a low-exposure image for which a 12 bit image is compressed to 6 bits by the gamma correction.

In the transmission unit 107, if transmitting an image of 10 bits is a maximum transmission amount for example, the low-exposure image 1002 must be transmitted without letting the transmission channel 107 idle. In contrast to this, because the low-exposure image 1004 is compressed to 6 bits and then transmitted, it is possible to let the transmission unit 107 idle for 40% of the transmission period.

In this way, when an object is darker, in control of the compression rate in the second image compression unit 106, it is possible to increase the compression rate in accordance with a gamma correction of the low-exposure image, and it is possible to let the transmission unit 107 idle. As a result, it is possible to allow for a power consumption reduction. In addition, even if the object is brighter, in control of the compression rate in the second image compression unit 106, compression rate control in accordance with a gamma correction of a low-exposure image is performed to no small degree, and it is possible to prevent a deficiency of transmission capability for the transmission channel.

By taking such a configuration, in image compression that satisfies the bandwidth of a transmission channel in moving image capturing, it is possible to transmit an image by further increasing a compression rate after determining the brightness and dynamic range of an object. Consequently, it is possible to obtain a composite image of a moving image by lower power consumption while realizing many pixels and a high frame rate.

(Second Embodiment)

Figure 12:
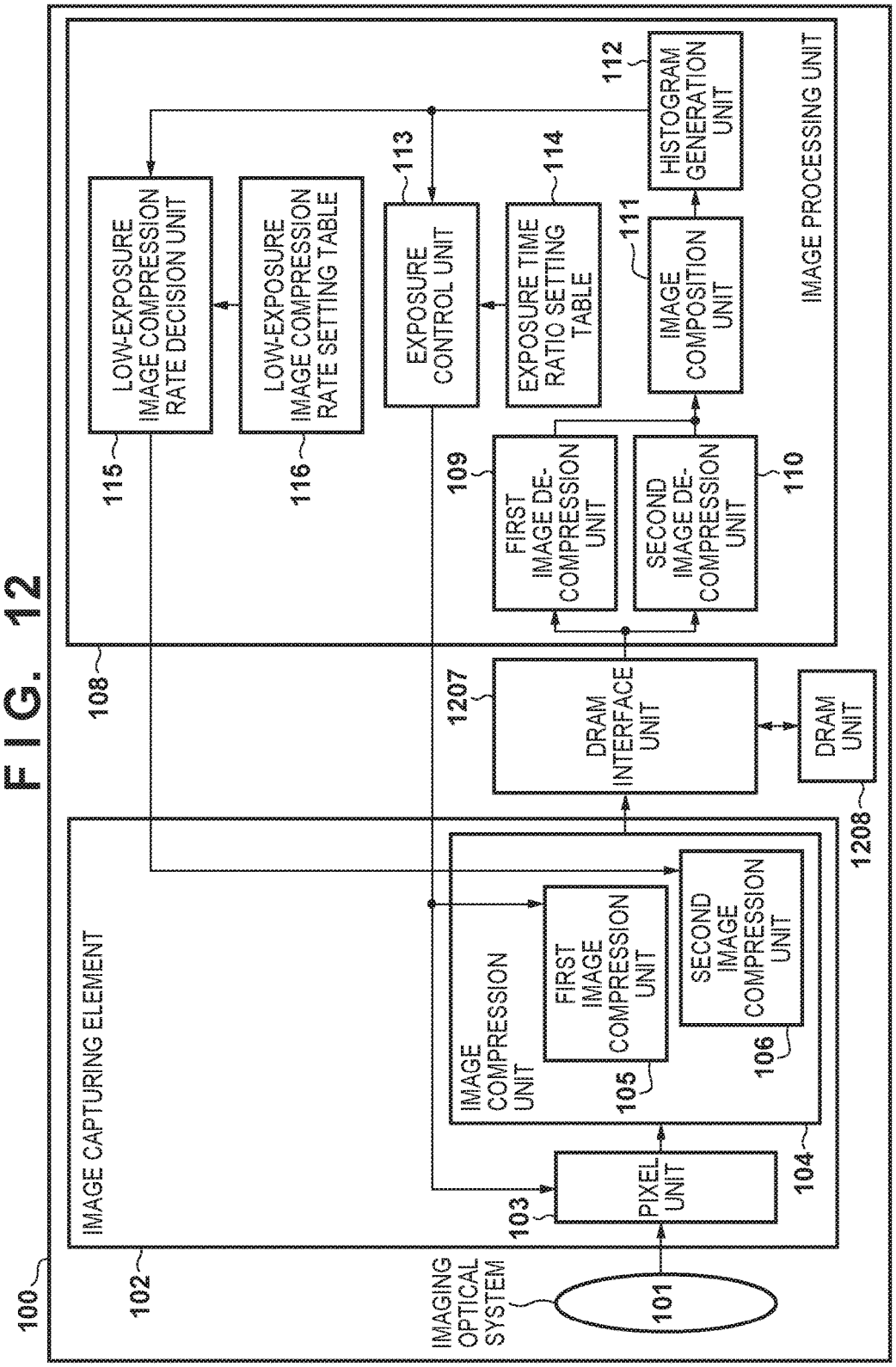
FIG. 12 is a view illustrating a configuration of a second embodiment of the image capturing apparatus of the present invention.

Below, FIG. 12 is used to give an explanation regarding a second embodiment of the present invention. Note that, in FIG. 12, the same reference numerals are added to configuration elements that are the same as in FIG. 1, and explanation thereof is omitted.

In FIG. 12, a DRAM interface unit (memory interface) 1207 receives a high-exposure image and a low-exposure image from the image compression unit 104 and writes them to a DRAM unit (buffer memory) 1208 at a predetermined data rate, or reads from the DRAM unit 1208 for transmission to the image processing unit 108. Other configuration elements are the same as in the first embodiment.

By such a configuration, in image compression that satisfies the bus bandwidth of the DRAM interface unit 1207 illustrated in FIG. 12 in moving image capturing, the dynamic range and brightness of an object are determined to transmit an image with an increased compression rate. Consequently, it is possible to obtain a composite image of a moving image by lower power consumption while realizing many pixels and a high frame rate.

Explanation is thus given for advantageous embodiments of the present invention, but the present invention is not limited to these embodiments, and various variations and changes are possible within the scope of the spirit of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-056458, filed Mar. 22, 2017 which is hereby incorporated by reference herein in its entirety.

What is claimed is:

1. An image capturing apparatus, comprising:
an image capturing unit configured to capture an object and output a moving image;
an acquisition unit configured to acquire from the image capturing unit at least two images having different exposures for a first frame of the moving image;
a compression unit configured to generate at least two compressed images by performing respectively different compression processing on the at least two images having different exposures for the first frame of the moving image;
a transmission unit configured to transmit the at least two compressed images;
a composition unit configured to generate a composite image by compositing the transmitted at least two compressed images; and
a luminance distribution acquisition unit configured to acquire luminance distribution information of the composite image,
wherein the acquisition unit controls exposures of the at least two images having different exposures in a second frame of the moving image based on the luminance distribution information acquired by the luminance distribution acquisition unit, and
the compression unit generates at least two another compressed images by performing respectively different compression processing on the at least two images having different exposures in the second frame of the moving image based on the luminance distribution information and the exposures of the at least two images having different exposures in the second frame of the moving image.

2. The image capturing apparatus according to claim 1, wherein the acquisition unit controls exposure so as to set an exposure time ratio of a high-exposure image having a longer exposure time with respect to a low-exposure image having a shorter exposure time, out of the at least two images having different exposures in the second frame of the moving image, to be smaller according to the luminance distribution information of the composite image so that a dynamic range of the object is lower and set the exposure time ratio of the high-exposure image with respect to the low-exposure image to be larger according to the luminance distribution information of the composite image so that the dynamic range of the object is higher.

3. The image capturing apparatus according to claim 2, wherein the luminance distribution acquisition unit determines a dynamic range of the composite image based on a luminance histogram of the composite image.

4. The image capturing apparatus according to claim 2, wherein the compression unit performs first compression processing for deleting upper bits of the high-exposure image, based on the exposure time ratio of the high-exposure image with respect to the low-exposure image.

5. The image capturing apparatus according to claim 4, wherein, in the first compression processing, upper bits of a range covered by the low-exposure image are deleted out of the upper bits of the high-exposure image.

6. The image capturing apparatus according to claim 2, wherein the compression unit performs second compression processing for performing tone compression of the low-exposure image based on a brightness of the composite image determined based on the luminance distribution information.

7. The image capturing apparatus according to claim 6, wherein the luminance distribution acquisition unit determines a brightness of the composite image based on a luminance histogram of the composite image.

8. The image capturing apparatus according to claim 7, wherein, in the second compression processing, the low-exposure image is subject to the tone compression by adjusting a gamma curve.

9. The image capturing apparatus according to claim 1, wherein the transmission unit transmits the at least two compressed images generated for the at least two images having different exposures for the first frame of the moving image and the at least two another compressed images generated for the at least two images having different exposures for the second frame of the moving image by a predetermined frame rate.

10. The image capturing apparatus according to claim 1, wherein the transmission unit has a memory interface and a buffer memory, and transmits the at least two compressed images generated for the at least two images having different exposures for the first frame of the moving image and the at least two another compressed images generated for the at least two images having different exposures for the second frame of the moving image to the buffer memory by a predetermined data rate.

11. A method of controlling an image capturing apparatus provided with an image capturing unit operable to capture an object and output a moving image, the method comprising:
acquiring by an acquisition unit from the image capturing unit at least two images having different exposures for a first frame of the moving image;
generating by a compression unit at least two compressed images by performing respectively different compression processing on the at least two images having different exposures for the first frame of the moving image;
transmitting by a transmission unit the at least two compressed images;
generating by a composition unit a composite image by compositing the transmitted at least two compressed images; and
acquiring by a luminance distribution acquisition unit a luminance distribution information of the composite image,
wherein exposures of the at least two images having different exposures in a second frame of the moving image are controlled by the acquisition unit based on the luminance distribution information acquired by the luminance distribution acquisition unit, and
generating by the compression unit at least two another compressed images by performing respectively different compression processing on the at least two images having different exposures in the second frame of the moving image based on the luminance distribution information and the exposures of the at least two images having different exposures in the second frame of the moving image.

12. A non-transitory computer-readable storage medium storing a program for causing a computer to execute each step of a method of controlling an image capturing apparatus provided with an image capturing unit operable to capture an object and output a moving image, the method comprising:
acquiring by an acquisition unit from the image capturing unit at least two images having different exposures for a first frame of the moving image;
generating by a compression unit at least two compressed images by performing respectively different compression processing on the at least two images having different exposures for the first frame of the moving image;
transmitting by a transmission unit the at least two compressed images;
generating by a composition unit a composite image by compositing the transmitted at least two compressed images; and
acquiring by a luminance distribution acquisition unit a luminance distribution information of the composite image, wherein exposures of the at least two images having different exposures in a second frame of the moving image are controlled by the acquisition unit based on the luminance distribution information acquired by the luminance distribution acquisition unit, and generating by the compression unit at least two another compressed images by performing respectively different compression processing on the at least two images having different exposures in the second frame of the moving image based on the luminance distribution information and the exposures of the at least two images having different exposures in the second frame of the moving image.

\* \* \* \* \*